United States Patent
Kim

(10) Patent No.: US 12,271,189 B2
(45) Date of Patent: Apr. 8, 2025

(54) SYSTEM AND METHOD FOR VEHICLE REMOTE CONTROL SYSTEM

(71) Applicant: HYUNDAI MOBIS CO., LTD., Seoul (KR)

(72) Inventor: Tae Hyeok Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 207 days.

(21) Appl. No.: 17/931,836

(22) Filed: Sep. 13, 2022

(65) Prior Publication Data
US 2023/0104444 A1  Apr. 6, 2023

(30) Foreign Application Priority Data
Oct. 1, 2021  (KR) .......... 10-2021-0130542

(51) Int. Cl.
*B60W 30/06* (2006.01)
*G05D 1/00* (2006.01)

(52) U.S. Cl.
CPC .......... *G05D 1/0016* (2013.01); *B60W 30/06* (2013.01); *G05D 1/0022* (2013.01); *B60W 2556/45* (2020.02)

(58) Field of Classification Search
CPC ................................................ B60W 30/06
See application file for complete search history.

(56) References Cited

U.S. PATENT DOCUMENTS

| | | | | |
|---|---|---|---|---|
| 10,899,365 B2* | 1/2021 | Hayakawa | ........ | B62D 15/027 |
| 2009/0309970 A1* | 12/2009 | Ishii | .......... | B60R 1/27 348/143 |
| 2018/0170365 A1* | 6/2018 | Shani | ........ | G05D 1/0282 |
| 2019/0023223 A1* | 1/2019 | Yoo | ........ | B60R 25/043 |
| 2019/0054927 A1* | 2/2019 | Hayakawa | ........ | G08G 1/143 |
| 2020/0218249 A1* | 7/2020 | Sannodo | ........ | B62D 1/00 |
| 2020/0294325 A1* | 9/2020 | Mueller-Lerwe | ..... | H04L 67/125 |
| 2020/0310430 A1* | 10/2020 | Shoda | ........ | G05D 1/0212 |
| 2021/0089020 A1* | 3/2021 | Shimamoto | ........ | G01C 21/3605 |
| 2021/0155231 A1* | 5/2021 | Shimamoto | ........ | B60W 50/10 |

FOREIGN PATENT DOCUMENTS

KR   10-1746573   6/2017

OTHER PUBLICATIONS

English Language Abstract of KR 10-1746573 published Jun. 14, 2017.

* cited by examiner

*Primary Examiner* — Long T Tran
(74) *Attorney, Agent, or Firm* — DLA PIPER LLP US

(57) ABSTRACT

The present invention discloses a vehicle remote control system that includes a user interface including an input portion receiving an input of vehicle control from a user, a communication portion wirelessly communicating with a vehicle control unit, and an informing portion outputting information, and an information control unit commanding the informing portion of the user interface to output information at start time or end time of drive control or specific event occurrence time during the drive control when the drive control including start control or move control of the vehicle is performed by the vehicle drive control unit being controlled through the user interface.

12 Claims, 4 Drawing Sheets

SYSTEM AND METHOD FOR VEHICLE REMOTE CONTROL SYSTEM

CROSS REFERENCE TO RELATED APPLICATION

The present application claims priority to Korean Patent Application No 10-2021-0130542, filed Oct. 1, 2021, the entire contents of which is incorporated herein for all purposes by this reference.

BACKGROUND OF THE INVENTION

Field of the Invention

The present invention relates to a vehicle remote control system and method, and more particularly, to a vehicle remote control system and method for applying a vibration motor to a vehicle smart key to inform a user of a vehicle state while a remote smart parking assist (RSPA) remote moving forward and backward function is performed.

Description of the Related Art

Recently, the size of vehicles is increasing, the width of a large vehicle reaching almost two meters. However, according to the current parking lot act, the standard minimum width of a regular parking space is only 2.3 m. Accordingly, the free space is only 40 cm for a vehicle having a width of 1.9 m, and considering the thickness of the passenger door, the space for getting in and out of the vehicle is very tight.

The RSPA refers to a remote smart parking assist system that helps a user park a vehicle more conveniently and safely. The remote moving forward and backward function of the RSPA is a necessity to resolve parking problems, and a rapidly increasing number of vehicles employ the remote moving forward and backward function of the RSPA recently. The user needs to move the vehicle forward and backward by the RSPA while remaining outside the vehicle. However, there are problems in some parking lots in that the vehicle is far away from the user or that the user, blocked by nearby obstacles, does not see the vehicle.

When it comes to the conventional vehicle remote control system, the smart key is far away from the vehicle, is subject to interference from the nearby obstacles and other vehicles, and only has an input interface with no output interface such that only one-way communication from the driver is allowed, thereby posing problems that the user does not know if the vehicle engine is started or if the vehicle is moving forward and backward correctly.

Recently, there are active studies on a vehicle remote control system that employs in the smart key a vibration motor applied to the cell phones and informs the user of the vehicle state while the RSPA remote moving forward and backward function is performed.

The matters described as a background of the present invention are intended only for a better understanding of the background of the present invention and are not to be taken as acknowledgment that they pertain to the conventional art already known to those skilled in the art.

SUMMARY OF THE INVENTION

An object of the present invention is to provide a vehicle remote control system and method for employing a vibration motor in a vehicle smart key and informing the user of the vehicle state while the RSPA remote moving forward and backward function is performed.

According to the present invention to address the technical issue described above, the vehicle remote control system includes a user interface including an input portion receiving an input of vehicle control from a user, a communication portion wirelessly communicating with a vehicle drive control unit, and an informing portion outputting information, and an information control unit commanding the informing portion of the user interface to output information at start time or end time of the drive control or specific event occurrence time during the drive control when the drive control including start control or move control of the vehicle is performed by the vehicle drive control unit being controlled through the user interface.

The user interface may include a vehicle smart key.

The start time or end time of the drive control may be the time at which the vehicle engine is started or stopped or the time at which the remote moving forward and backward of the vehicle is completed.

The specific event occurrence time during the drive control may be the pause time at which the vehicle is put into a pause.

The information control unit may determine the priority of the pause time of the vehicle and command the informing portion of the user interface to output information according to the determined priority.

The information control unit may be disposed inside the vehicle and command the informing portion of the user interface to output information.

The information output by the informing portion may be vibration information.

The number of vibrations and the vibration intensity of the vibration information output by the informing portion may vary according to the start time or end time of the drive control or the specific event occurrence time during the drive control.

According to the present invention to address the technical issue described above, a vehicle remote control method includes receiving an input of the vehicle control from the user and wirelessly communicating with the vehicle drive control unit, performing drive control including start control or move control of the vehicle, and outputting information through the informing portion of the user interface at the start time or end time of the drive control or the specific event occurrence time during the drive control.

When the vehicle engine is stopped, remotely starting the vehicle engine before receiving an input of the vehicle control and wirelessly communicating with the vehicle drive control unit may be further included.

Information may be output through the informing portion of the user interface at the pause time at which the vehicle is put into a pause, in the outputting information through the informing portion of the user interface.

The priority of the pause time of the vehicle may be determined and the information may be output through the informing portion of the user interface according to the determined priority, in the outputting information through the informing portion of the user interface at the pause time.

When the pause of the vehicle is lifted after the information of pause is output through the informing portion of the user interface at the pause time, transmitting the lift state to the user interface for the user to input the vehicle control again may be further included.

Transmitting the on or off state of the vehicle engine or remote moving forward and backward state of the vehicle to the user interface before performing the drive control may be further included.

According to the present invention, the vehicle remote control system applies the vibration motor to the vehicle smart key and informs the user of the vehicle state while the RSPA remote moving forward and backward function is performed, thereby increasing convenience.

The effects that may be obtained by the present invention are not limited to the above-mentioned effects, and other effects not mentioned will be clearly understood by those skilled in the art to which the present invention pertains from the following description.

DETAILED DESCRIPTION OF THE INVENTION

Figure 1:
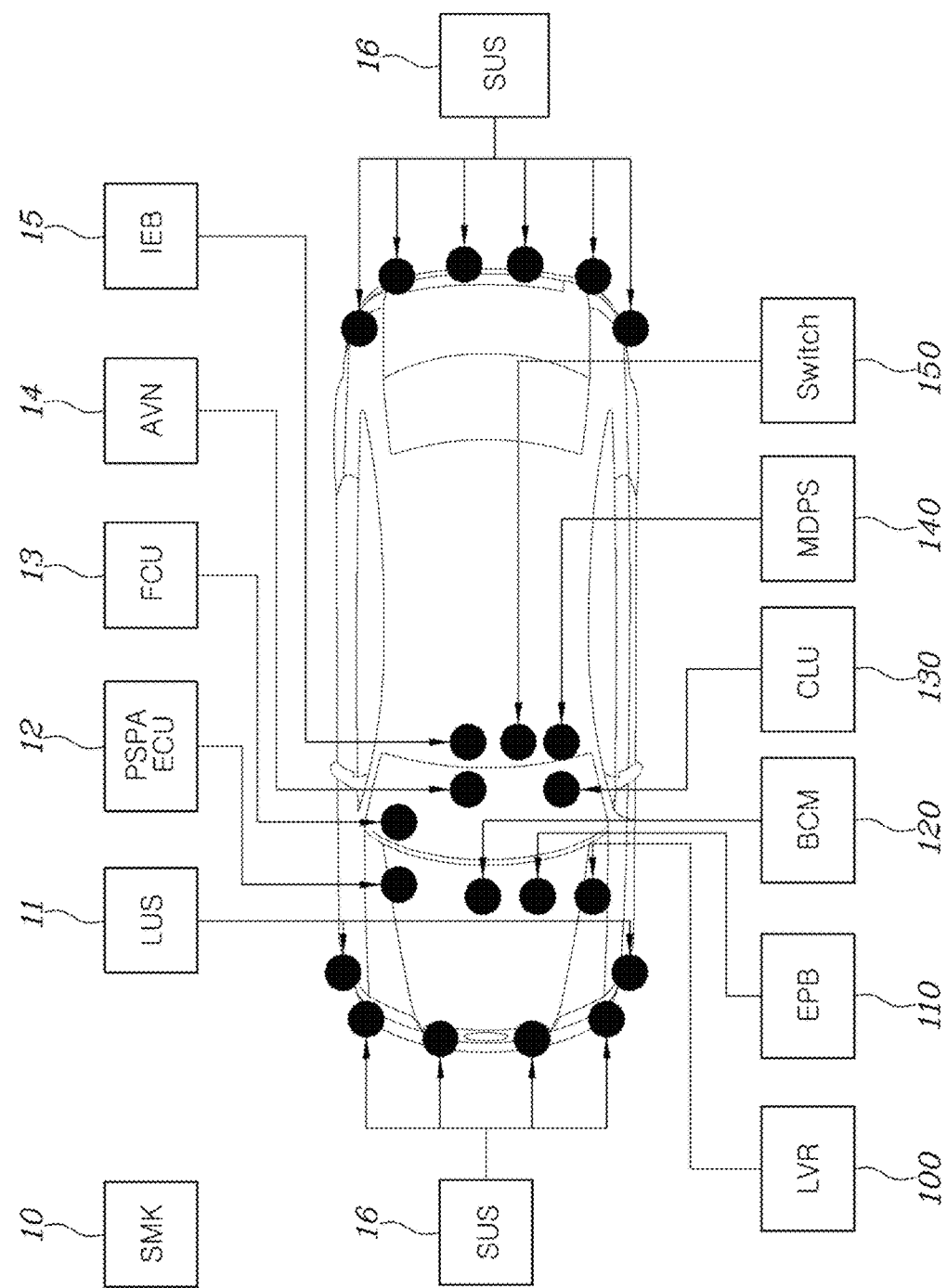
FIG. 1 is a view illustrating devices constituting a vehicle remote control system according to the present invention.

The specific structural or functional descriptions of the embodiments disclosed in the present specification or application are merely exemplified for the purpose of describing the embodiments according to the present invention. The embodiments of the present invention may be implemented in various forms, and the present invention is not to be interpreted as being limited to the embodiments described in the present specification or application. Embodiments of the present invention will be described in detail with reference to the accompanying drawings in the following.

The embodiment according to the present invention may be subject to various modifications and have various forms so that specific embodiments will be illustrated in the drawings and described in detail in the present specification or application. It is to be understood that this is not intended to limit the embodiments according to the concept of the present invention to the specific disclosed forms and that all modifications, equivalents, and substitutes within the spirit and technical scope of the present invention are included.

Unless otherwise defined, all terms used herein, including technical or scientific terms, may have the same meanings as are generally understood by those skilled in the art to which the present invention pertains. The terms such as those defined in commonly used dictionaries are to be interpreted as having meanings consistent with their meanings in the context of the related technology and are not to be interpreted in an idealized or overly formal sense unless expressly so defined herein.

The present invention is described in detail in the following by describing preferred embodiments of the present invention with reference to the drawings. The same reference numerals presented in each drawing refer to the same members.

Figure 2:
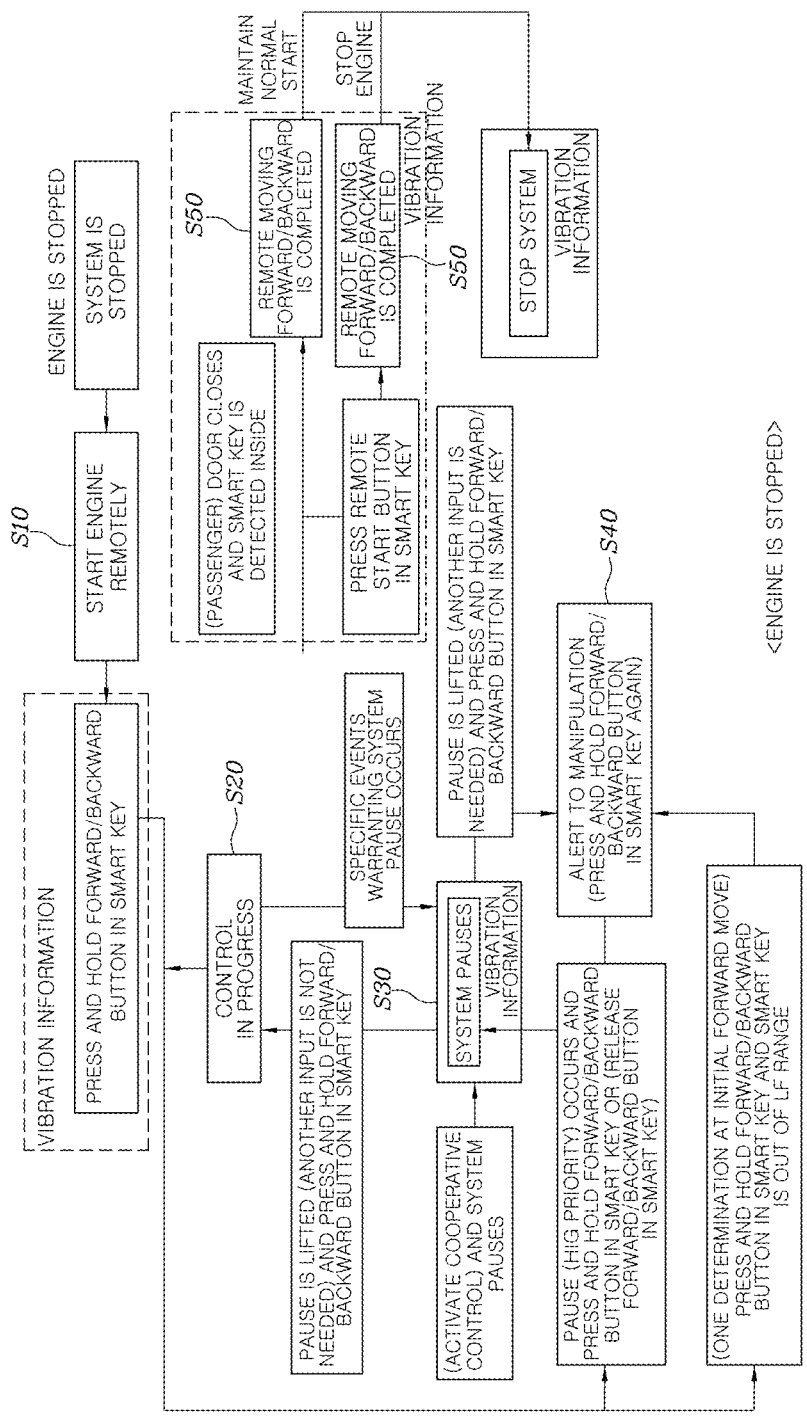
FIG. 2 is a view illustrating a method of entering a vehicle remote control system when the engine is stopped according to the present invention.
Figure 3:
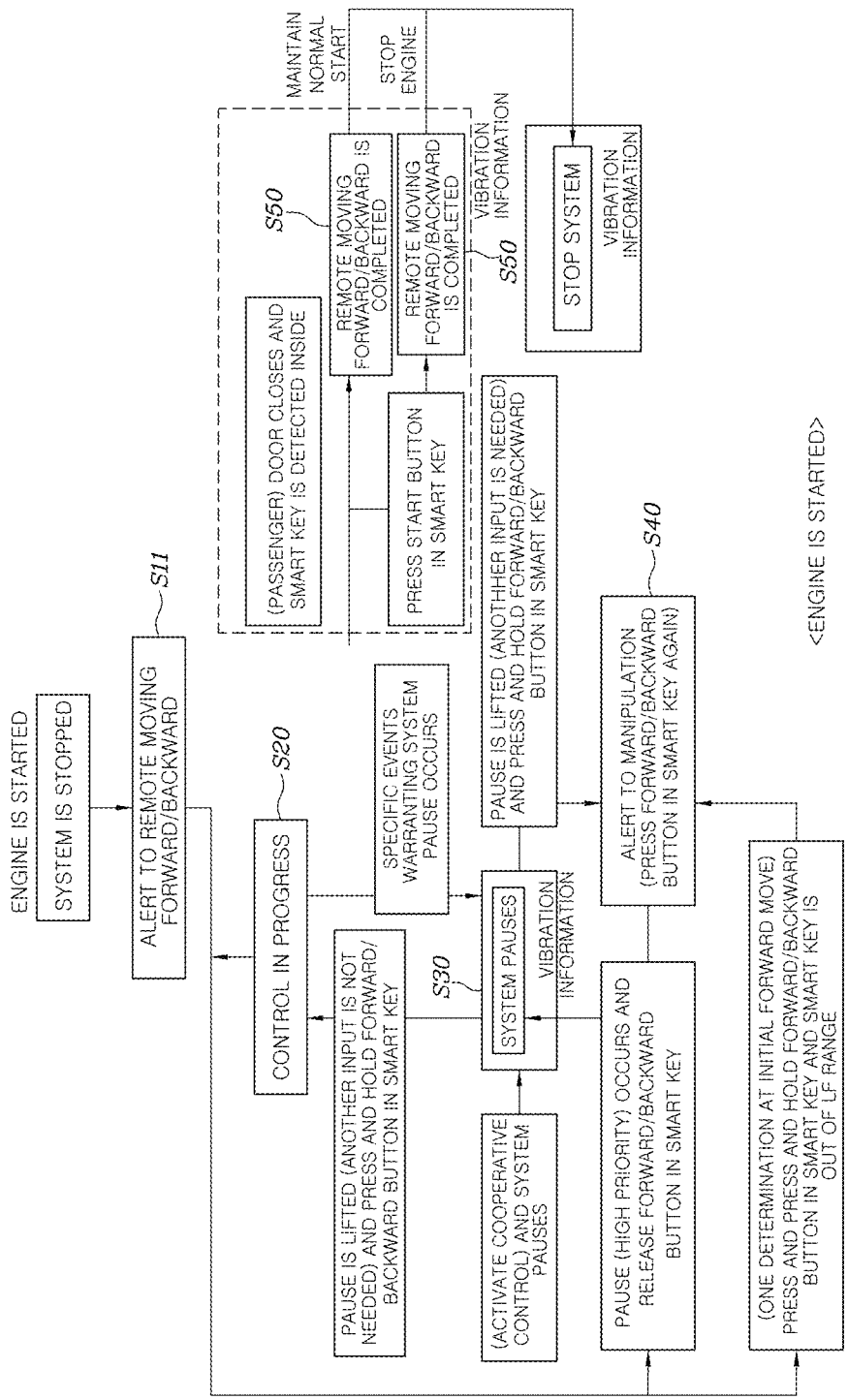
FIG. 3 is a view illustrating a method of entering a vehicle remote control system when the engine is started according to the present invention.
Figure 4:
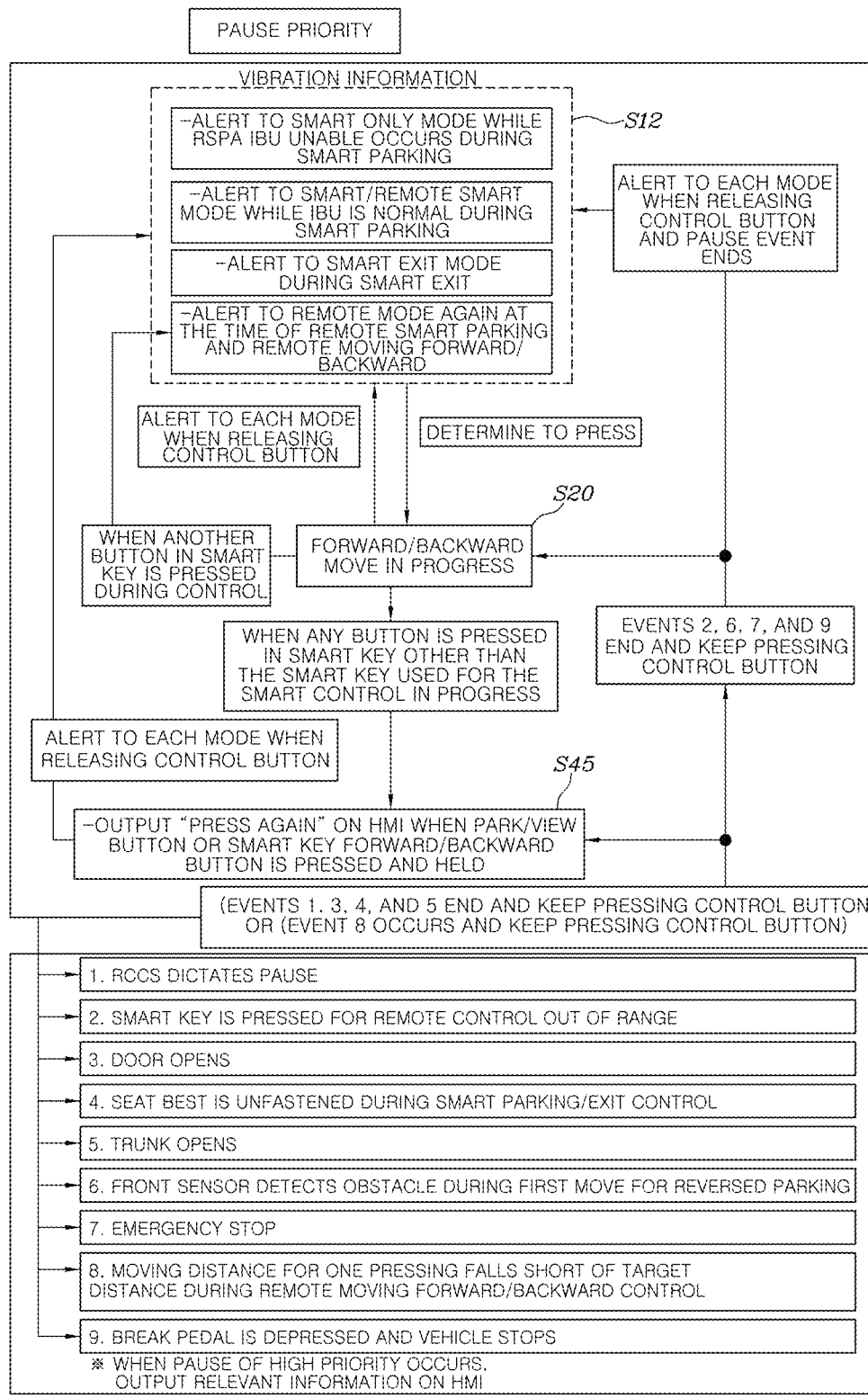
FIG. 4 is a view illustrating the pause time at which a vehicle is put into a pause and the priority of the pause time of the vehicle in a vehicle remote control system according to the present invention.

FIG. 1 is a view illustrating devices constituting a vehicle remote control system according to the present invention. FIG. 2 is a flowchart illustrating a vehicle remote control method when the engine is stopped according to the present invention. FIG. 3 is a flowchart illustrating a vehicle remote control method when the engine is started according to the present invention. FIG. 4 is a view illustrating the pause time at which a vehicle is put into a pause and the priority of the pause time of the vehicle in a vehicle remote control system according to the present invention.

FIG. 1 is a view illustrating devices constituting the vehicle remote control system according to the present invention.

FIG. 1 shows the vehicle remote control system includes a user interface including an input portion receiving an input of vehicle control from a user, a communication portion wirelessly communicating with a vehicle drive control unit, and an informing portion outputting information, and an information control unit commanding the informing portion of the user interface to output information at start time or end time of the drive control or specific event occurrence time during the drive control when the drive control including start control or move control of the vehicle is performed by the vehicle drive control unit being controlled through the user interface.

A feature of the present invention is that a vibration motor is applied to a vehicle smart key 10 to inform a user of a vehicle state while an RSPA remote moving forward and backward function is performed. To this end, two-way communication between the user in possession of the smart key 10 and the vehicle through an output interface as well as an input interface for controlling the vehicle is needed.

In general, the smart key 10 is far away from the vehicle, is subject to interference from the nearby obstacles and other vehicles, and only has an input interface with no output interface such that only one-way communication from the driver is allowed, thereby posing problems that the user often does not know if the vehicle engine is started or if the vehicle is moving forward and backward correctly.

If the user may be informed when the start control is performed to start or stop the vehicle engine or when the drive control is performed to move the vehicle, the user may know if the vehicle engine is successfully started or the remote moving forward and backward is completed by the control through the smart key 10 so that convenience is increased.

Accordingly, if the information is output through the informing portion of the user interface at the start time or end time of the drive control or the specific event occurrence time during the drive control when the drive control including the start control or move control is performed, the user may know if the control through the smart key 10 has successfully started the vehicle engine and if the remote moving forward and backward of the vehicle is completed.

Specifically, the user interface includes an input portion receiving an input of the vehicle control from the user, a communication portion wirelessly communicating with the vehicle drive control unit, and an informing portion outputting information. The user interface refers to the smart key 10 used by the user to start or stop the vehicle engine and move the vehicle and includes a communication portion wirelessly communicating with a system that systemically operates with the vehicle, that is, the drive control units such as a vehicle safety system (LUS) 11, a remote control unit (RSPA ECU) 12, a fuel cell control unit (FCU) 13, an infotainment system (AVN) 14, an integrated electric brake system (IEB) 15, a suspension (SUS) 16, an electronic shift lever (LVR) 100, an electronic parking brake (EPB) 110, a body control module (BCM) 120, a cluster (CLU) 130, a motor-driven power steering (MDPS) 140, a switch 150, and the like. And the user interface includes an input portion inputting remote control commands into the smart key 10 for remote start control or move control of the vehicle. Also included is an informing portion configured to inform the user of the vehicle state by outputting vibration information while the RSPA remote moving forward and backward function is performed.

When the drive control including the start control or move control of the vehicle is performed by the vehicle drive control unit being controlled through the user interface, the information control unit commands the informing portion of the user interface to output information at the start time or end time of the drive control or the specific event occurrence time during the drive control. Here, the start time or end time of the drive control may include the time at which the vehicle engine is started or stopped but is not limited thereto. The time when the vehicle control starts and ends may also be included. The specific event during the drive control refers to a pause of the vehicle. When the vehicle is put into a pause, the information control unit commands the informing portion of the user interface to output the pause information to satisfy the need of the user to be informed of the pause through the smart key 10.

More specifically, the user interface includes the vehicle smart key 10.

The user interface refers to any device configured to control the vehicle drive unit as well as start or stop the vehicle engine and is not limited to the vehicle smart key 10. The user may control the vehicle drive control unit through the vehicle smart key 10 and may recognize the vehicle state.

FIG. 2 is a view illustrating a vehicle remote control method when the vehicle engine is stopped according to the present invention. FIG. 3 is a view illustrating a vehicle remote control method when the vehicle engine is started according to the present invention.

The start time or end time of the drive control may be the time at which the vehicle engine is started or stopped or the time at which the remote moving forward and backward of the vehicle is completed.

FIGS. 2 and 3 are views respectively illustrating vehicle remote control processes when the engine is started and when the engine is stopped with the vehicle remote control system turned off. When the vehicle engine is stopped, the engine first needs to be remotely started through the user interface. When the vehicle engine is started, the remote moving forward and backward of the vehicle may be performed by pressing and holding a forward or backward button which is an input portion of the smart key 10. When the user presses a start button in the input portion of the user interface, the information control unit may recognize the start time of the drive control and command the informing unit of the user interface to output the information. When the system senses that a vehicle door closes and that the smart key is inside the vehicle at the same time, the information control unit may recognize the end time of the drive control and command the informing portion of the user interface to output information.

FIG. 4 is a view illustrating the pause time at which a vehicle is put into a pause and the priority of the pause time of the vehicle in a vehicle remote control system according to the present invention.

The specific event occurrence time during the drive control may be pause time at which the vehicle is put into a pause. In addition, the information control unit may determine the priority of the pause time of the vehicle and command the informing portion of the user interface to output information according to the determined priority.

The vehicle is put into a pause when the RCCA which is a rear cross collision avoidance system dictates the pause, when the remote control is input into the user interface out of the range, when a vehicle door opens, when a seat belt is unfastened while smart parking and exit are performed, and when a vehicle trunk opens. In addition, the vehicle may be also put into a pause when the front and side sensors detect an obstacle while the vehicle is during the first reversed parking, when the vehicle stops for emergency, when the moving distance for one pressing falls short of the target distance when remotely moving the vehicle forward and backward, and when the brake pedal is depressed and the vehicle stops. The events that warrant the pause of the vehicle may be prioritized in the order described above. When both an event of high priority and an event of low priority occur simultaneously, it is determined that the vehicle is put into a pause due to the event of high priority.

When the vehicle is put into a pause, the informing portion of the user interface may be commanded to output information about the pause. In addition, the user does not need to input again through the input portion to lift the pause. Once the pause is lifted, the remote moving forward and backward of the vehicle may be performed by pressing and holding a forward or backward button which is an input portion. Even when a second input is needed to lift the pause, the vehicle may be moved forward and backward by pressing and holding the forward or backward button which is the input portion. When the pause is lifted, the lift state may be transmitted to the user interface for the user to input the vehicle control again so that the user may be alerted to input the vehicle control again.

The information control unit is disposed inside the vehicle and commands the informing portion of the user interface to output information. The information output by the informing portion is vibration information.

The vehicle drive control unit is disposed inside the vehicle to be controlled through the informing portion of the user interface. For example, the information control unit, disposed inside the vehicle, may most quickly learn the state of the vehicle including specific time such as the start time or end time of the drive control or the specific event occurrence time during the drive control and communicate with the informing portion.

The number of vibrations and the vibration intensity of the vibration information output by the informing portion vary according to the start time or end time of the drive control or the specific event occurrence time during the drive control.

The number of vibrations and the vibration intensity of the vibration information output by the informing portion may vary according to the gravity of the events such as the start of the vehicle engine, the detection of an object, and the pause of the vehicle. The user may sense the type of event through the varying vibration information, or the increased number of vibrations and stronger vibrations in an emergency may alert the user to the emergency.

According to the present invention, a vehicle remote control method includes receiving an input of vehicle control and wirelessly communicating with a vehicle drive control unit, performing drive control including a vehicle start control or move control (S20), outputting information through an informing portion of a user interface at start time or end time of the drive control or specific event occurrence time during the drive control (S20, S40, S50).

Detailed technical features in each step of the vehicle remote control method according to the present invention are the same as or similar to the technical features of each configuration of the vehicle remote control system according to the present invention described above so that a detailed description thereof will be omitted.

When the vehicle engine is stopped, remotely starting the vehicle engine (S10) before receiving an input of the vehicle control from a user and wirelessly communicating with the vehicle drive control unit is further included.

The informing portion of the user interface is commanded to output information at pause time at which the vehicle is put into a pause, in the outputting information through the informing portion of the user interface (S20, S30, S50).

The priority of the pause time of the vehicle is determined and the information is output through the informing portion of the user interface according to the determined priority, in the outputting information through the informing portion of the user interface at the pause time (S30).

When the pause is lifted after the information of pause is output through the informing portion of the user interface at the pause time (S30), transmitting the lift state to the user interface for the user to input the vehicle control again so that the user may be alerted to input the vehicle control again (S40, S45) may be further included.

Transmitting the on or off state of the vehicle engine or the remote moving forward and backward state of the vehicle to the user interface (S11, S12) before performing the drive control (S20) may be further included.

Information is output through the informing portion of the user interface while smart parking or exit is performed, in the transmitting the on or off state of the vehicle engine or the remote moving forward and backward state of the vehicle to the user interface (S11, S12).

As described above, specific embodiments of the present invention are illustrated and described, but it will be obvious to those skilled in the art that the present invention may be improved upon and modified in various manners without deviating from the technical spirit of the present invention provided in the following claims.

According to the vehicle remote control system of the present system, a vibration motor may be applied to a vehicle smart key to inform the user of the vehicle state while the RSPA remote moving forward and backward function is performed.

DESCRIPTION OF REFERENCE NUMERALS

10: smart key (SMK)
11: vehicle safety system (LUS)
12: remote control device (RSPA ECU)
13: fuel-cell control unit (FCU)
14: infotainment system (AVN)
15: electronic braking device (IEB)
16: suspension (SUS)
100: electronic shift lever (LVR)
110: electronic parking brake (EPB)
120: body control module (BCM)
130: cluster (CLU)
140: motor-driven power steering (MDPS)
150: switch

What is claimed is:

1. A vehicle remote control system comprising:
    a user interface including an input portion configured to receive an input of vehicle control from a user, a communication portion configured to wirelessly communicate with a vehicle drive controller, and an informing portion configured to output information; and
    an information controller configured to command the informing portion of the user interface to output information at a specific event occurrence time during the drive control while the drive control including start control or move control of the vehicle is performed by the vehicle drive controller being controlled through the user interface, wherein the information output by the informing portion includes vibration information, wherein a number of vibrations and a vibration intensity of the vibration information output by the informing portion vary according to a determined priority level of the specific event occurrence time during the drive control, wherein the vibration intensity and number of vibrations increases as the determined priority level increases.

2. The vehicle remote control system of claim 1, wherein the user interface includes a vehicle smart key.

3. The vehicle remote control system of claim 1, wherein the start time or end time of the drive control includes a time at which a vehicle engine is started or stopped or a time at which remote moving forward and backward of the vehicle is completed.

4. The vehicle remote control system of claim 1, wherein the specific event occurrence time during the drive control includes a pause time at which the vehicle is put into a pause.

5. The vehicle remote control system of claim 4, wherein the information controller is configured to determine priority of the pause time of the vehicle and command the informing portion of the user interface to output information according to the determined priority.

6. The vehicle remote control system of claim 1, wherein the information controller is disposed inside the vehicle and is configured to command the informing portion of the user interface to output information.

7. A vehicle remote control method comprising:
    receiving, by a user interface, an input of vehicle control from a user and wirelessly communicating with a vehicle drive controller;
    performing, by the vehicle drive controller, drive control including start control or move control of the vehicle; and
    outputting, by the user interface, information through an informing portion of the user interface at a specific event occurrence time during the drive control, wherein outputting the information comprises outputting vibration information, wherein a number of vibrations and a vibration intensity of the vibration information vary according to a determined priority level of the specific event occurrence time during the drive control, wherein the vibration intensity and number of vibrations increases as the determined priority level increases.

8. The vehicle remote control method of claim 7, further including remotely starting the vehicle engine before receiving an input of the vehicle control and wirelessly communicating with the vehicle controller.

9. The vehicle control method of claim 7, wherein the outputting information includes outputting information through the informing portion of the user interface at a pause time at which the vehicle is put into a pause.

10. The vehicle remote control method of claim 9, wherein the outputting information at the pause time includes determining a priority of the pause time of the vehicle, and wherein the information is output through the informing portion of the user interface according to the determined priority.

11. The vehicle remote control method of claim 9, further comprising, when the pause is lifted after the information is output through the informing portion at the pause time, transmitting the lift state to the user interface for the user to input the vehicle control again.

12. The vehicle remote control method of claim 7, further comprising transmitting an on or off state of the vehicle engine or a remote moving forward and backward state of the vehicle to the user interface before performing the drive control.

\* \* \* \* \*